UNITED STATES PATENT OFFICE.

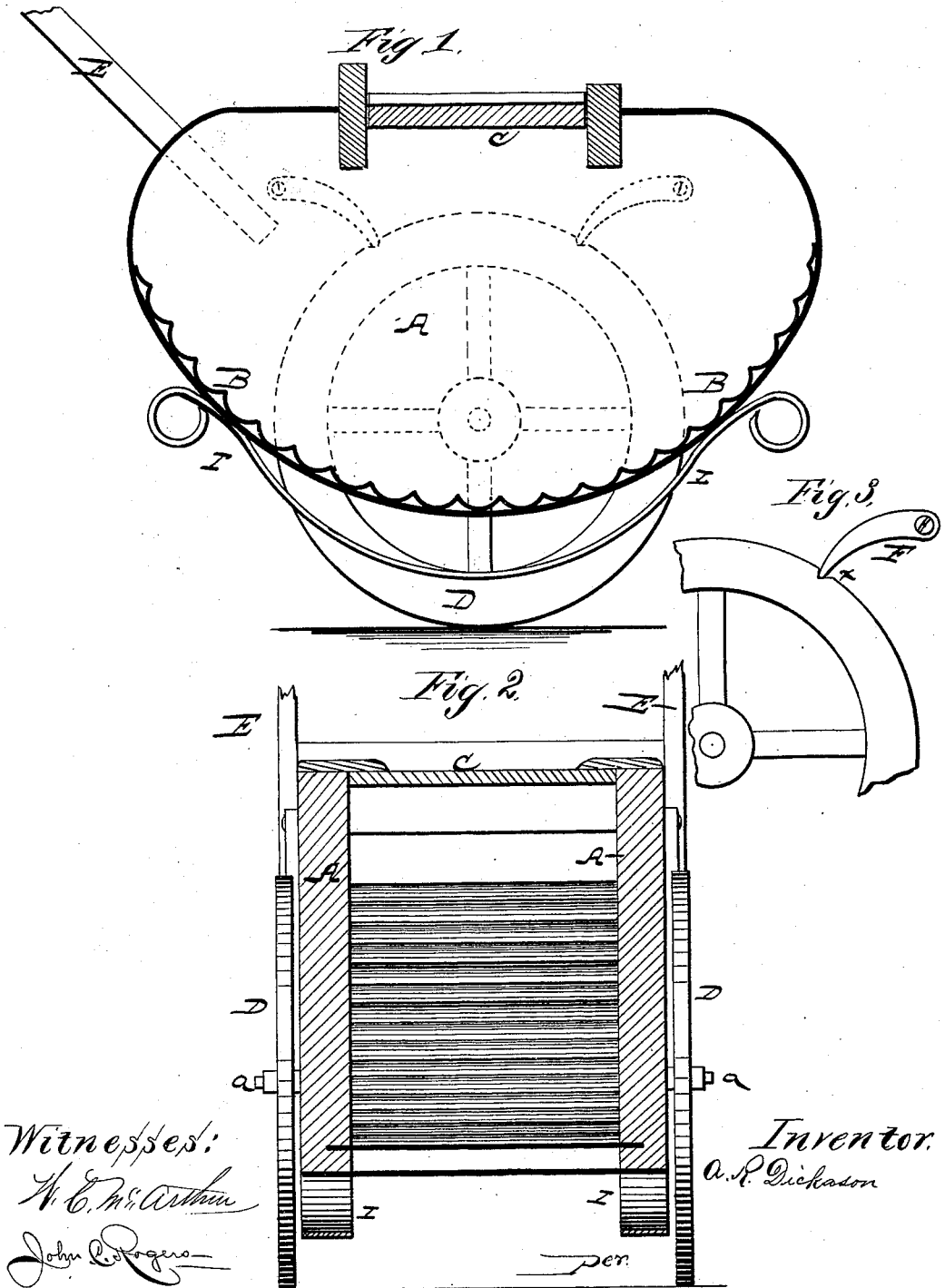

ALEXANDER R. DICKASON, OF LYNDON, KANSAS, ASSIGNOR TO HIMSELF AND CHARLES BRAUN.

IMPROVEMENT IN WASHING-MACHINES.

Specification forming part of Letters Patent No. 210,302, dated November 26, 1878; application filed August 29, 1878.

*To all whom it may concern:*

Be it known that I, ALEXANDER R. DICKASON, of Lyndon, in the county of Osage and State of Kansas, have invented certain new and useful Improvements in Washing-Machines; and I do hereby declare that the following is a full, clear, and exact description thereof, reference being had to the accompanying drawings, and to the letters of reference marked thereon, which form part of this specification.

The nature of my invention consists in the construction and arrangement of a washing-machine, as will be hereinafter more fully set forth.

In order to enable others skilled in the art to which my invention appertains to make and use the same, I will now proceed to describe its construction and operation, referring to the annexed drawings, in which—

Figure 1 is a central longitudinal section; Fig. 2, a cross-section; and Fig. 3, a detail view of the wheel, showing the pawls and notches.

A represents the washing-machine box, made somewhat in triangular form, but the corners and two of the sides being, however, rounded, as shown. The box is constructed of two side pieces with a continuous piece of sheet metal, forming the bottom and ends of the box. On the bottom of the box is placed a corrugated zinc bottom, B, to form the washing-surface. The top of the box is provided with a lid, C, as shown. Each side of the box is provided with a projecting stud or spindle, a, upon which is placed a wheel, D, the two wheels forming the support for the box, and by means of which the machine can be easily moved from place to place on the floor, as desired. In the peripheries of the wheels D D are made notches x x, into which pawls F F, pivoted to the sides of the box, may be made to engage, and thus prevent the wheels from rotating. The wheels D then form rockers, on which the machine may be rocked back and forth by means of handles E E. To the under side of the box are attached springs I I, which cause the machine to rebound at each stroke, and thus facilitate the operation of washing.

The machine is cheap and simple in construction, not liable to get out of order, easily manipulated, and quickly moved from place to place.

Having thus fully described my invention, what I claim as new, and desire to secure by Letters Patent, is—

1. A washing-machine mounted upon two wheels, provided with a locking mechanism, whereby the wheels may be made to act as rockers, substantially as herein set forth.

2. The combination of the box A, the wheels D D, provided with notches x x in their peripheries, and the pawls F, substantially as and for the purposes herein set forth.

3. The springs I I, attached to the under side of the box A, in combination with the wheels D, for the purposes herein set forth.

In testimony that I claim the foregoing as my own I affix my signature in presence of two witnesses.

A. R. DICKASON.

Witnesses:
   D. F. COON,
   H. WEBB.